May 26, 1959 A. C. BILLETDEAUX 2,888,620
HIGH RESISTANCE SEMICONDUCTOR CELLS
Filed April 30, 1956
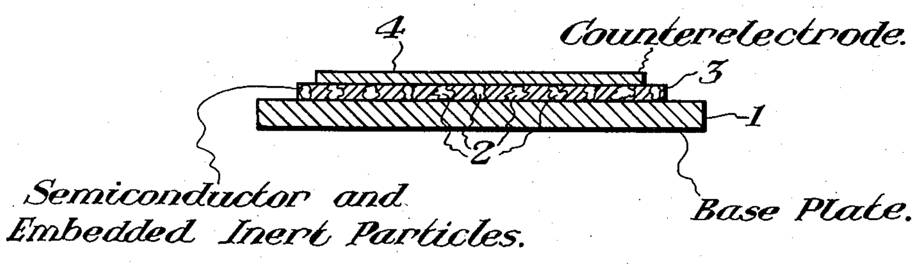
INVENTOR.
Adrian C. Billetdeaux.
BY W. L. Stout.
HIS ATTORNEY United States Patent Office 2,888,620
Patented May 26, 1959

2,888,620

HIGH RESISTANCE SEMICONDUCTOR CELLS

Adrian C. Billetdeaux, Braddock Hills, Pa., assignor to Westinghouse Air Brake Company, Wilmerding, Pa., a corporation of Pennsylvania Application April 30, 1956, Serial No. 581,809

7 Claims. (Cl. 317—241)

My invention relates to semiconductor cells, and particularly to selenium cells having a high resistance and to methods of manufacturing such cells.

Rectifier cells of high resistance are used in high impedance vacuum tube circuits. Since the resistance of selenium cells is inversely proportional to the active area of the cells, very small cell elements are used in such circuits. In manufacturing high resistance rectifier cells it has been the practice to produce cells of large areas and interpose between the semiconductor layer and the counterelectrode, a layer of insulating material covering a portion of the semiconductor layer, as, for example, a layer of paper with an opening therein.

It is an object of my invention to provide a method of manufacturing high resistance semiconductor rectifier cells having high rectification ratios.

Another object of the present invention is to provide a method of manufacturing high resistance selenium cells wherein the active area of the semi-conductor layer is reduced during the application of the selenium layer to a base plate or electrode.

In carrying out my invention, a desired quantity of powdered selenium in its amorphous form is distributed evenly over a suitable base plate or electrode to a desired height. A small amount of an inert material, which is nonconductive and thermally stable over the range of temperatures used in processing selenium cells, is sprinkled lightly over the layer of powdered selenium. The semiconductor layer is then subjected to the usual heat treatment under pressure to convert the amorphous selenium to its crystalline state. It has been found that the inert material is embedded in the semiconductor layer, thereby reducing the active area of the layer.

Other objects and characteristic features of my invention will become apparent as the description proceeds.

I shall describe one method of manufacturing high resistance rectifier cells embodying my invention, and shall then point out the novel features thereof in claims.

In the accompanying drawing, the sole figure comprises a cross-sectional elevation of a semiconductor cell constructed in accordance with one embodiment of my invention.

In manufacturing high resistance selenium cells embodying my invention standard procedures are followed. In one such procedure an aluminum base plate is prepared for the application of a semiconductor layer by roughening one surface of the plate either chemically or by gritblasting. The base plate is then chemically cleaned by dipping the plate into a nitric acid solution, rinsing the plate in water, and then drying the plate. A layer of steel is then sprayed onto the cleaned, roughened base plate.

A semiconductor material in powder form is distributed evenly over the prepared base plate, the material being preferably selenium in its amorphous form. The powder may be prepared in accordance with the methods outlined in Letters Patent of the United States No. 2.307,474 issued to Leslie Ernest Thompson on January 5, 1943, and No. 2,361,156 issued to Leslie Ernest Thompson and Alexander Jenkins on October 24, 1944, the powder being a mixture of selenium, selenium dioxide, sodium chloride, sulphur and water.

The standard procedure is now varied to include the novel features of my invention. An inert material, granular in form, is sprinkled lightly over the layer of selenium powder. The size of the granules of the inert material is preferably in the order of about 4.0 mils (100 microns) in diameter, or approximately equal to the height of the resultant semiconductor layer of the cell. The base plate with the selenium layer is then treated to the usual heated press operation.

In one such heated press operation, the plate and its layer of semiconductor material are subjected in a heated press to a pressure in the order of 1000 to 2000 pounds per square inch at a temperature of approximately 130° C. for approximately 1½ minutes. The plate and its semiconductor layer are then annealed at a temperature of approximately 205° C. to 215° C. for a period of from 8 to 40 minutes. After annealing, the rectifier element is permitted to cool, and a barrier layer formed on the selenium layer by any of the well-known processes, as, for example, immersing the plate in a sodium hydroxide solution. A counterelectrode of a metal or an alloy is then applied to the element in any suitable manner. The rectifier element may then be electroformed if desired, the forming of the cells however is not a prerequisite for the intended use of the cells. In the preparation of small selenium cells of the order of about 0.09 inch in diameter, the method described may be used to prepare a large rectifier plate and the individual cells punched out of the base plate.

I have found that the granules of inert material sprinkled over the selenium powder are embedded by the heated press operation in the layer of crystalline selenium adhering to the base plate. For the most part, the granules of the inert material engage the base plate of the rectifier cell and the counterelectrode layer, thus effectively reducing the active area of the cell. In one such cell, for example, the outside diameter of the cell is 0.09 inch but the effective diameter of the cell is only 0.015 inch.

The material used in manufacturing high resistance rectifier cells must be chemically inert to any of the chemical solutions or materials used in the manufacture of the cells, must be electrically nonconductive, and must be thermally stable over a wide range of temperatures used in the manufacturing processes. Some of the inert materials found suitable for such purposes include silica gel, glass, silica, alumina and mica. The degree to which the active area of a particular cell is reduced will determine the amount of the inert material sprinkled over the semiconductor material distributed over the base plate.

As shown in the drawing, a completed semiconductor cell, in accordance with one embodiment of my invention, comprises a base plate 1, an intermediate layer including inert particles 2 embedded in a semiconductor 3, and a counterelectrode 4.

I have found that rectifier cells manufactured in accordance with my novel method will have a higher reverse resistance than cells made by standard procedures. While the resultant cells have a somewhat higher forward resistance, the increase in the reverse resistance by my process is such that the retification ratios of the cells are higher than that of rectifier cells made by standard procedures.

Although I have herein described only one method of manufacturing high resistance rectifier cells embodying my invention, it is understood that various changes and modifications may be made therein within the scope of the appended claims without departing from the spirit and scope of my invention.

Having thus described my invention, what I claim is:

1. A semiconductor element comprising a base plate, a semiconductor layer on said base plate; granules of an inert, nonconductive, thermally stable material embedded in said semiconductor layer; the granules of the embedded material having diameters substantially equal to the height of the semiconductor layer; and a counterelectrode layer on said semiconductor layer.

2. A semiconductor element comprising a base plate, a selenium layer on said base plate; granules of an inert, nonconductive, thermally stable material embedded in said selenium layer; said material being one of the group comprising silica gel, glass, silica, alumina and mica; and a counterelectrode layer on said selenium layer.

3. A semiconductor element comprising a base plate; a selenium layer on said base plate; granules of an inert, nonconductive, thermally stable material embedded in said selenium layer, said material being one of the group comprising silica gel, glass, silica, alumina and mica; the granules of the embedded material having diameters substantially equal to the height of the selenium layer; and a counterelectrode layer on said selenium layer.

4. A method of manufacturing a semiconductor element comprising the steps of evenly distributing powdered selenium in its amorphous form over a base plate; sprinkling an inert, nonconductive, thermally stable material in granular form on the selenium layer; subjecting the plate to pressure and heat to adhere the selenium to the plate, annealing the plate to convert the selenium to its crystalline form, forming the barrier layer and depositing a counterelectrode layer on the barrier layer.

5. A method of manufacturing a semiconductor element comprising the steps of evenly distributing powdered selenium in its amorphous form over a base plate; sprinkling an inert, nonconductive, thermally stable material in granular form on the selenium layer, said material being one of the group comprising silica gel, glass, silica, alumina and mica; subjecting the plate to pressure and heat to adhere the selenium to the base plate, annealing the plate to convert the selenium to its crystalline form, forming a barrier layer, and depositing a counterelectrode layer on the barrier layer.

6. A method of manufacturing a semiconductor element comprising the steps of evenly distributing powdered selenium in its amorphous form over a base plate; sprinkling an inert, nonconductive, thermally stable material in granular form on the selenium layer, the granules of the inert material having diameters substantially equal to the height of the selenium layer; subjecting the plate to pressure and heat to adhere the selenium to the base plate, annealing the plate to convert the selenium to its crystalline form, forming a barrier layer, and depositing a counterelectrode layer on the barrier layer.

7. A method of manufacturing a high resistance selenium cell comprising the steps of evenly distributing powdered selenium in its amorphous form over a base plate; sprinkling an inert, nonconductive, thermally stable material in granular form on the selenium layer, said material being one of the group comprising silica gel, glass, silica, alumina and mica, the granules of the inert material having diameters substantially equal to the height of the selenium layer; subjecting the plate to pressure and heat to adhere the selenium to the plate, annealing the plate to convert the selenium to its crystalline form, forming a barrier layer, and depositing a counterelectrode layer on the barrier layer.

References Cited in the file of this patent

UNITED STATES PATENTS

| | | |
|---|---|---|
| 2,121,603 | Lotz | June 21, 1938 |
| 2,267,954 | Schumacher | Dec. 30, 1941 |
| 2,476,042 | Hewlett | July 12, 1949 |
| 2,485,589 | Gray | Oct. 25, 1949 |
| 2,663,831 | Klein | Dec. 22, 1953 |